(12) United States Patent
Bjorsvik

(10) Patent No.: US 10,030,774 B2
(45) Date of Patent: Jul. 24, 2018

(54) METAL SEAL FITTING FOR USE ON A PIPELINE

(71) Applicant: TDW Delaware, Inc., Wilmington, DE (US)

(72) Inventor: Vigmund Bjorsvik, Stavanger (NO)

(73) Assignee: TDW Delaware, Inc., Wilmington, DE (US)

( * ) Notice: Subject to any disclaimer, the term of this patent is extended or adjusted under 35 U.S.C. 154(b) by 950 days.

(21) Appl. No.: 14/493,479

(22) Filed: Sep. 23, 2014

(65) Prior Publication Data
US 2016/0084381 A1   Mar. 24, 2016

(51) Int. Cl.
| F16L 5/00 | (2006.01) |
| F16J 15/08 | (2006.01) |
| F16L 17/08 | (2006.01) |
| F16L 41/06 | (2006.01) |

(52) U.S. Cl.
CPC ......... F16J 15/0893 (2013.01); F16L 17/08 (2013.01); F16L 41/06 (2013.01)

(58) Field of Classification Search
CPC . F16L 17/08; F16L 17/02; F16L 41/04; F16L 41/06; F16L 41/12; F16L 41/08; F16L 41/088
USPC ........ 277/647, 650, 644; 285/197, 198, 199, 285/351, 917
See application file for complete search history.

(56) References Cited

U.S. PATENT DOCUMENTS

| 1,191,887 A | 7/1916 | Glauber |
| 3,313,553 A | 4/1967 | Gastineau |
| 3,999,785 A | 12/1976 | Blakeley |
| 4,114,907 A * | 9/1978 | Abbes ................. F16J 15/0893 277/647 |
| 4,730,636 A | 3/1988 | Volgstadt et al. |
| 4,811,976 A * | 3/1989 | Yagisawa ................ F16L 19/02 285/328 |
| 5,118,141 A * | 6/1992 | Miyashita ............ F16J 15/0893 285/23 |
| 5,374,087 A | 12/1994 | Powers |
| 5,653,477 A | 8/1997 | Waterman |
| 5,662,341 A | 9/1997 | Ezell et al. |

(Continued)

FOREIGN PATENT DOCUMENTS

| DE | 337866 | 6/1921 |
| EP | 0431309 A1 | 6/1991 |
| EP | 1912012 A1 | 4/2008 |

*Primary Examiner* — Aaron M Dunwoody
(74) *Attorney, Agent, or Firm* — Gable Gotwals

(57) ABSTRACT

A metal seal fitting for use on a pipe or pipeline includes at least one metal seal ring having a C-profile which houses a spring and is arranged concentric to, and outside of, a tap diameter of the access connection. The seal ring is double-curved so that it conforms to a pipe-facing side of the fitting. A surface of the pipe is prepared to receive the seal and, as the fitting is being secured to the pipe, the seal is activated and spring-energized. In its final sealing state, the seal is not compressed passed its deformation point and maintains its spring-back capability. After the fitting is removed from the pipe, the seal may be re-used. The metal seal fitting is suited for applications requiring a high integrity seal and can be used in high pressure, high temperature, and highly corrosive environments which are not well-suited for elastomeric seals.

7 Claims, 5 Drawing Sheets

(56) References Cited

U.S. PATENT DOCUMENTS

| 6,189,937 B1* | 2/2001 | Brandel | F16L 41/14 |
| | | | 285/197 |
| 7,992,594 B2 | 8/2011 | Bowie | |
| 2003/0102042 A1 | 6/2003 | Vu | |
| 2008/0217912 A1* | 9/2008 | Chaupin | F16L 17/02 |
| | | | 285/231 |

* cited by examiner

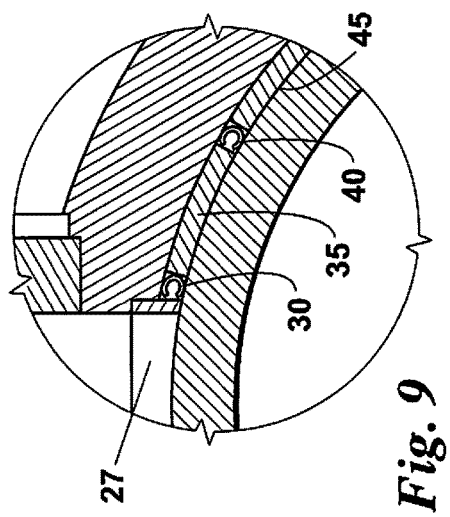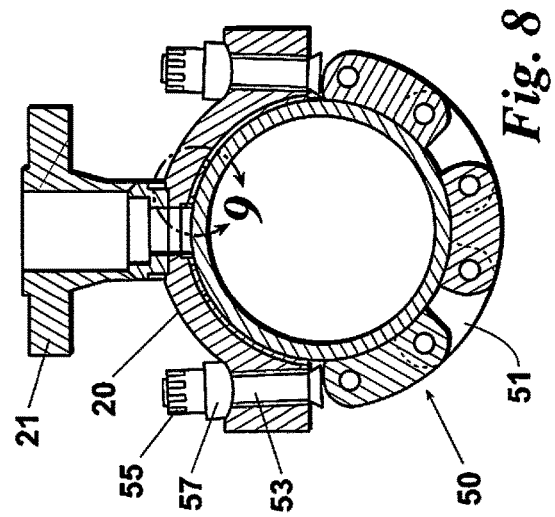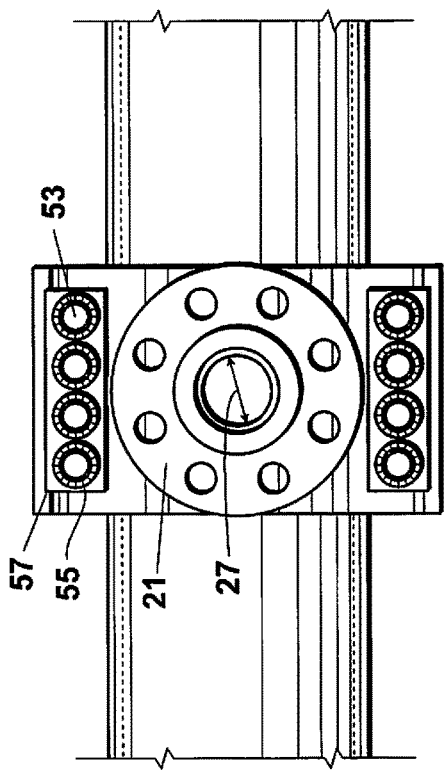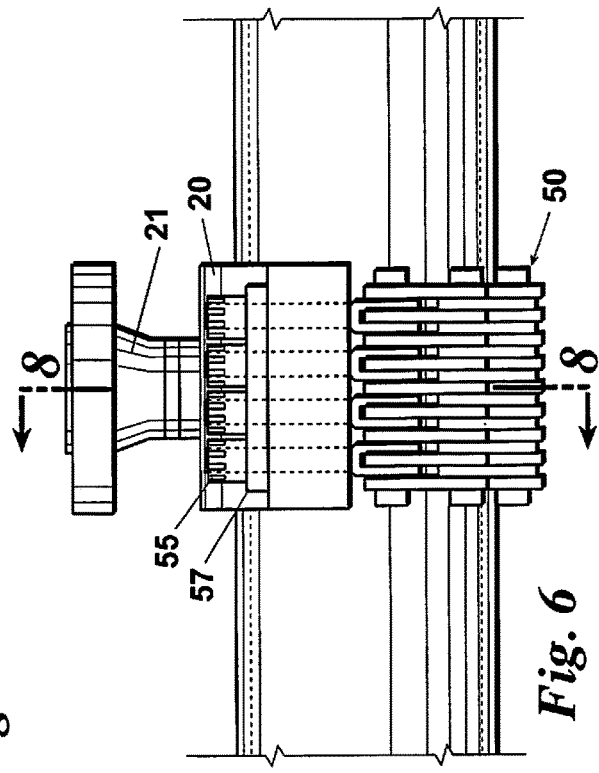

METAL SEAL FITTING FOR USE ON A PIPELINE

BACKGROUND

This invention relates generally to fittings used to seal a section of pipe during a hot tapping operation or where a sealed connection is needed. More specifically, the invention relates to fittings for use in pipe and pipeline applications in which a high integrity seal is required or in a high pressure, high temperature, or highly corrosive environment (or some combination of the three).

In the typical hot tapping application, such as that used in the petroleum industry, a fitting is welded on the exterior of a pipe that has flowing gas or liquid under pressure. The fitting includes a flange on its outlet connection side and a hot tapping machine is secured to the flange. By use of highly specialized equipment, a hole can then be drilled through the wall of the pipe while gas or liquid continues to flow in the pipe. This access hole or opening can be used to insert equipment which temporarily blocks flow through the pipe while repairs are being made to the pipe. After the repairs are complete, the equipment is removed but the opening that provides communication to the interior of the pipe needs to be closed. Preferably the closure is made in such a way that at some future date access can be again obtained through the fitting to the interior of the pipe.

In certain applications, the elastomeric seals used to seal between the clamp and the pipe may not be ideal because of a high pressure, high temperature, or highly corrosive environment (or some combination of the three). Here, the use of a metal seal might be desirable. For the purpose of this disclosure, high pressure is defined as 1500 psi and above. High temperature is 75° C. and above. Highly corrosive means an environment which is likely to effect the integrity of an elastomeric seal and for which a super alloy material is better suited.

The use of metal C-seal rings is well known in industrial or plant applications but is not known or used in sealing hot tap fittings to pipes. The application of metal C-seal rings to pipelines is not straightforward because the seals are "flat" and not "double curved" like those needed in a pipeline application. Additionally, the pipe surface itself—even if it were flat—does not lend itself to a metal seal. The pipe surface is typically coated with a protective coating and might have other surface irregularities or defects that pose a challenge to maintaining a proper seal.

SUMMARY OF THE INVENTION

A metal seal fitting made according to this invention has a C-profile in cross-section, is spring-energized and is double-curved so as to conform to a pipe-facing side of a saddle fitting which provides an access connection to an interior of a pipe. Preferably, no elastomeric seal is used in combination with metal seal fitting to seal around a tap diameter of the saddle fitting. The metal seal fitting can be operated in high pressure, high temperature, highly corrosive environments but can be used, and is intended for use, on pipes or pipelines where high integrity sealing is required.

The system which makes use of the metal seal fitting having a flanged access opening and a first, and optionally and preferably a second, metal seal ring having the C-profile and being double-curved. The first metal seal ring is larger in diameter than the tap diameter of the flanged access connection and is arranged concentric to that diameter. The second metal seal ring is larger in diameter than the first metal seal ring and, like that first metal seal ring, is arranged concentric to the tap diameter. The double-curve shape of the seal rings allow each seal ring to seal about the access hole to the pipe, which is usually made by way of a hot tap.

A first (ring-shaped) support plate is located between the first and second metal seal rings. When the metal seal rings are in a final sealing state, an outer periphery of the first metal seal ring and an inner periphery of the second metal seal ring are in contact with the first support plate. An outer periphery of the second metal seal ring is in contact with a second (saddle-shaped) support plate. Together, the two metal seal rings provide double block sealing about the tap.

Because the pipe is typically coated or has surface imperfections or defects, the surface of the pipe is prepared to receive the metal seal rings. Surface preparation means such as an industrial robot is used to prepare the surface.

The system also includes means for aligning the saddle fitting (and therefore the access connection) to the pipe and for securing the saddle fitting to the pipe. The securing means place the first and second metal seal rings in a final sealing state between the pipe-facing side of the saddle fitting and the pipe.

A method of double block sealing an access connection to a pipe which makes use of the system includes the step of securing the saddle fitting to the pipe so as to activate the first and second metal seals. When activated, the spring-energized metal C-seal rings can sustain high pressure from both sides. When pressure from inside the fitting is acting inside the "C," the seal increases its sealing pressure, thereby allowing for very high seal pressure. Because the contact area between the seal and pipe is very small (typically 1-3 mm thick), this high seal pressure does not result in critical pipe stress.

Objectives of this invention include providing a metal seal fitting that (1) is suitable for use in pipe and pipeline applications that require high integrity sealing, such as but not limited to hot tapping operations and pipe connections; (2) can be used in high pressure, high temperature, and highly corrosive environments; (3) has reusable metal seals which provide for high sealing pressure without causing critical pipe stress; (4) makes use of spring-energized, double-curve shaped metal C-seal rings; (5) eliminates the need for elastomeric seals about the access connection to the pipe.

BRIEF DESCRIPTION OF THE DRAWINGS

FIG. 6 is a front elevation view of the installed metal seal fitting of FIG. 4.

FIG. 7 is a top view of the installed metal seal fitting of FIG. 4.

FIG. 8 is a section view taken along section line 8-8 of FIG. 6.

FIG. 9 is an enlarged view of section 9 of FIG. 8.

ELEMENTS AND NUMBERS USED IN THE DRAWING FIGURES

Figure 2:
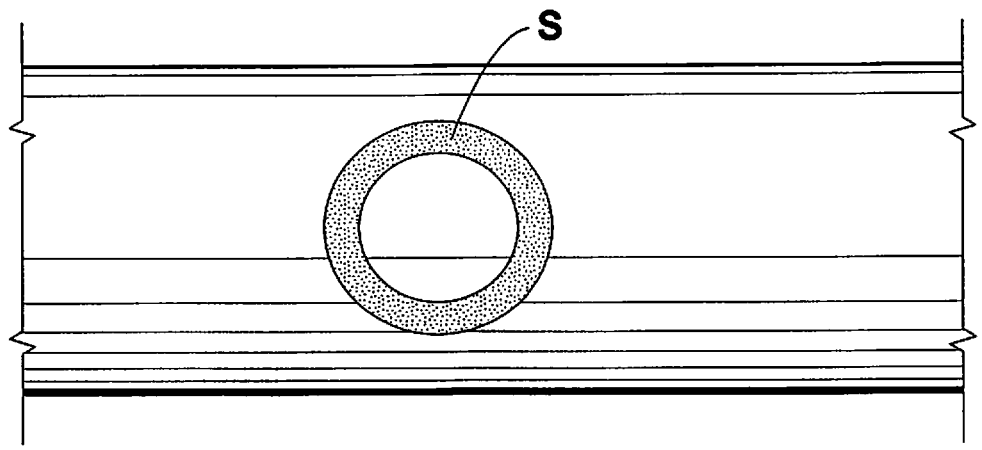
FIG. 2 is a top view of the pipe surface after it has been prepared to receive the metal seal fitting.

10 System
20 Metal seal fitting
21 Flanged access connection
23 Tap side
25 Pipe-facing side
27 Tap diameter (access opening to the pipe)
30 First metal C-seal ring or first metal seal ring
31 Spring
35 First (preferably ring-shaped) support plate
40 Second metal C-seal ring or second metal seal ring
41 Spring
45 Second (preferably saddle-shaped) support plate
47 Access opening
50 Securing means
51 Tensioning belt
53 Chain tension bolt
55 Clamp nut (or hex nut)
57 Clamp washer
70 Surface preparation means
71 Industrial robot
S Prepared surface

DETAILED DESCRIPTION OF THE PREFERRED EMBODIMENTS

Referring to the drawings, a preferred embodiment of a system 10 for use in a high pressure, high temperature, or highly corrosive environment includes a metal seal fitting 20 having a flanged access connection 21 on a tap side 23 of the fitting 20. The fitting 20, which can be a saddle-type fitting typically used in a hot tapping operation, must be placed into sealing engagement with a pipe so that an access hole can be made in the pipe with a hot tapping machine (not shown). The flanged access connection 21 is sized to accommodate the tap diameter 27 of the hot tap. System 10 makes use of one, and preferably two metal C-seal rings 30, 40 for sealing outside the hot tap.

Figure 3:
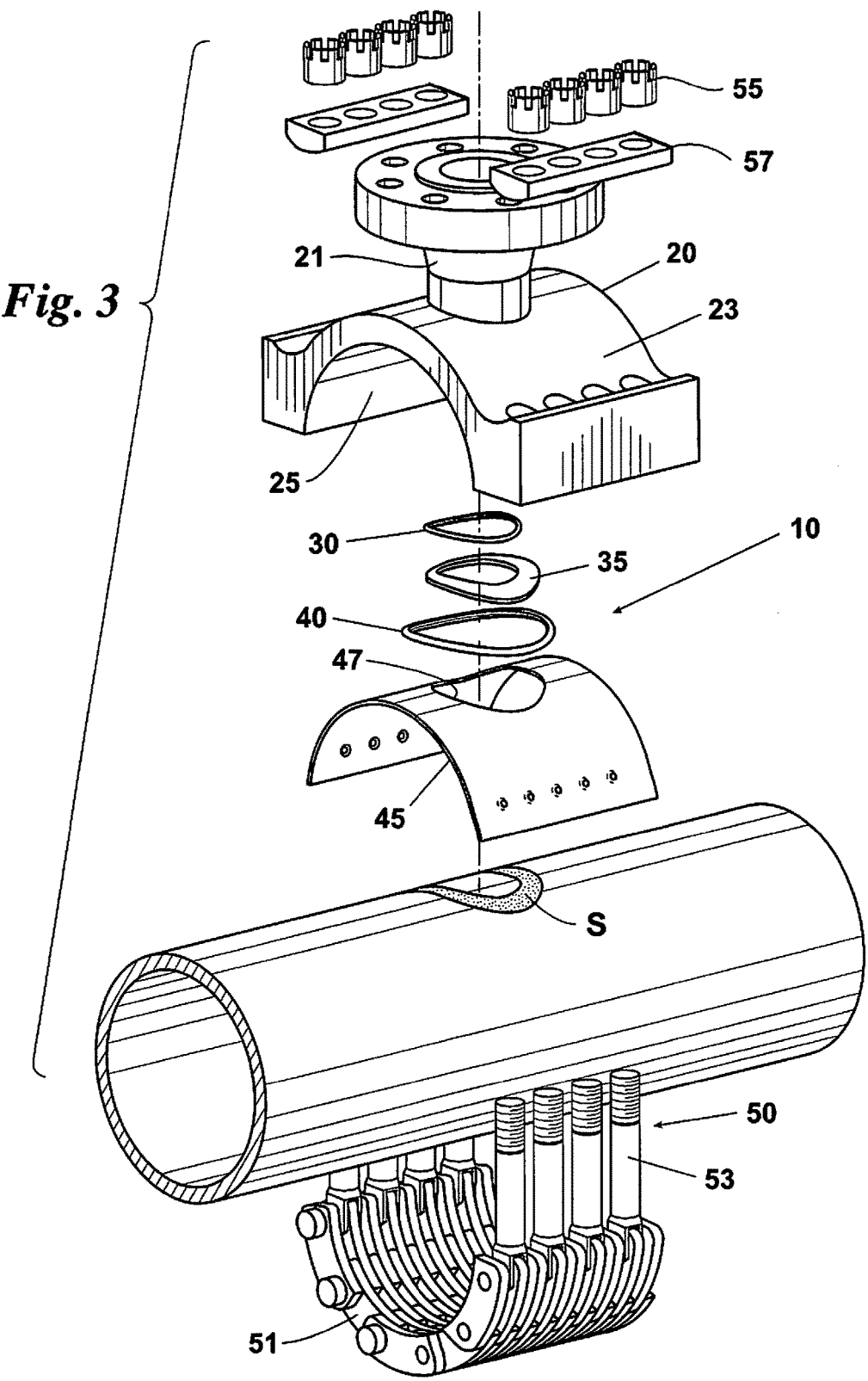
FIG. 3 is an exploded assembly view of the metal seal fitting. The fitting includes at least one metal C-ring seal which mates to and seals against the prepared surface.
Figure 4:
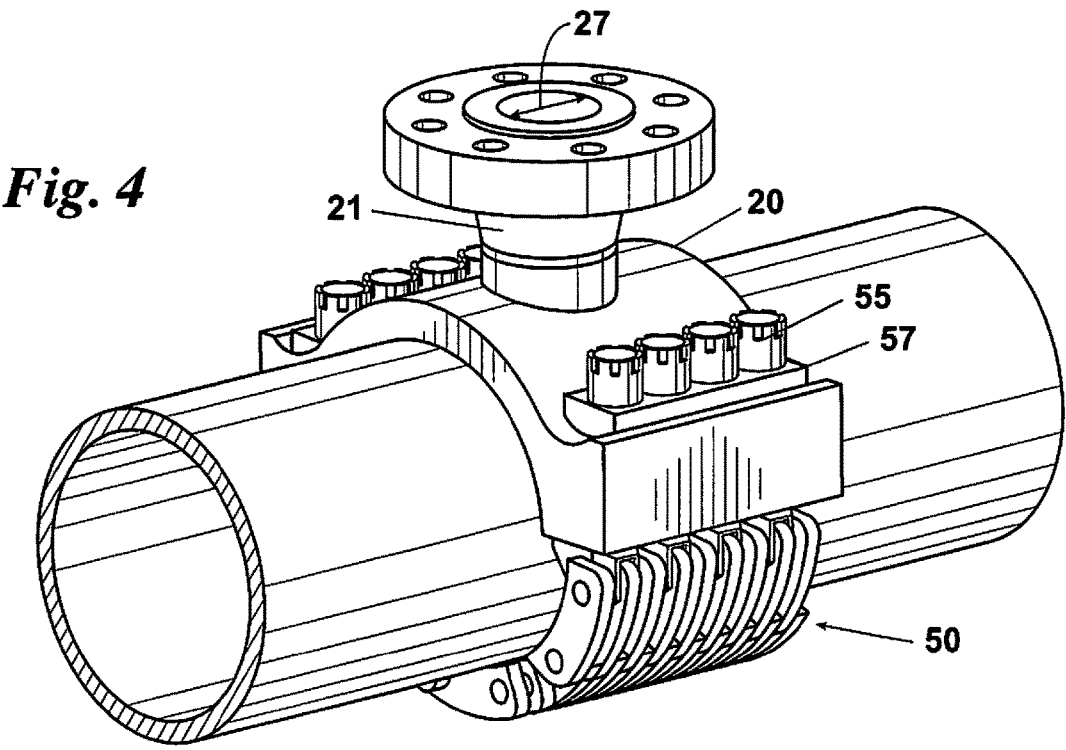
FIG. 4 is an isometric view of the assembled metal seal fitting of FIG. 3 when installed on the pipe.
Figure 5:
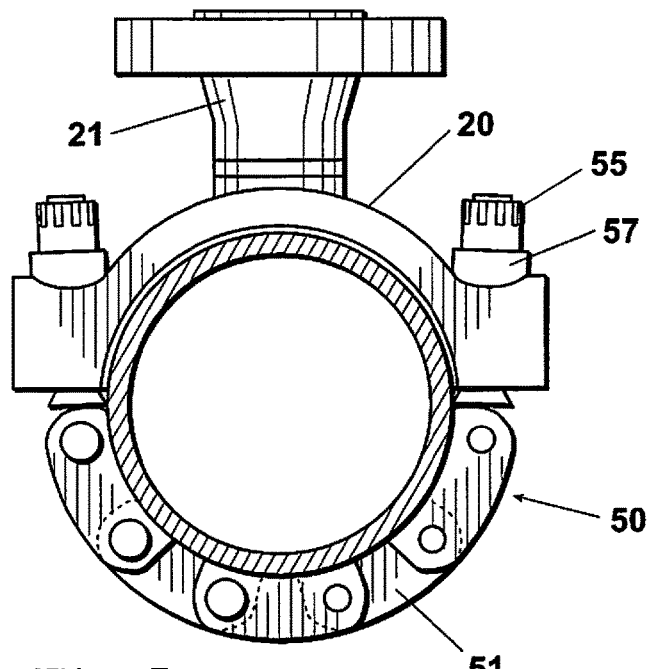
FIG. 5 is a side elevation view of the installed metal seal fitting of FIG. 4.

The first metal C-seal ring 30 is located immediately outside of, and about, the tap diameter 27 (see e.g. FIGS. 3 and 9). The second metal C-seal ring 40, which is larger in diameter than ring 30, is spaced apart from the first ring 30 by a first (ring-shaped) support plate 35. C-seal ring 30 is located about the inner periphery of support plate 35 and C-seal ring 40 is located about its outer periphery. A second (saddle-shaped) support plate 45 having an access opening 47 surrounds the second metal C-seal ring 40. The C-seal rings 30, 40 and support plates 35, 45 are each arranged coaxial to the flanged access connection 21. Depending on the application, suitable materials for C-seal rings 30, 40 include but are not limited to 321 stainless steel, Inconel® (Huntington Alloys Corp., Huntington, W.V.) and other high temperature alloys.

Figure 10:
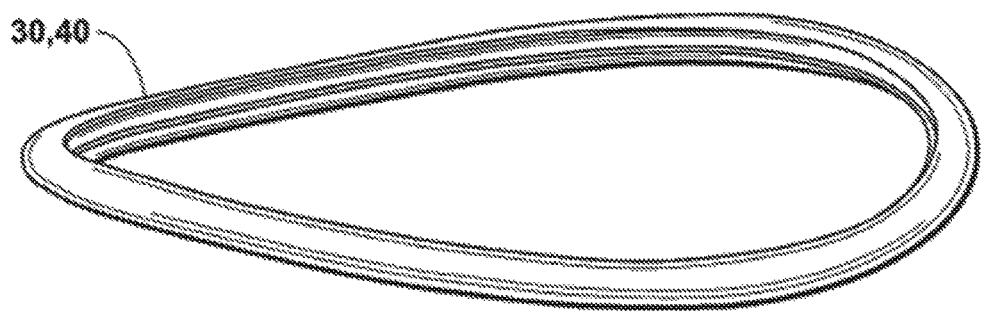
FIG. 10 is an isometric view of the metal C-seal ring used in the metal seal fitting of FIG. 3.

Unlike other metal C-seal rings, which are ring-shaped but flat, metal C-seal rings 30, 40 are double-curved so that each conforms to the arcuate shape of the pipe-facing side 25 of the fitting 20 (see e.g. FIG. 10). Double-curved means that the ring 30, 40 when resting on a horizontal plane, has portions which are in contact with the plane and portions which are not in contact with the plane. Note that ring-shaped support plate 35 and the access opening 47 of support plate 45 also have a similar double-curved shape (see FIG. 3). The plates 35, 45 help restrain and control the compression of the C-seal rings 30, 40.

Each metal C-seal ring 30, 40 is spring-energized by a spring 31, 41 and moves between an initial, non-sealing state (the free state) and a final, sealing position state. When in the final sealing position the C-seal ring is not at the point of permanent deformation and can spring-back (the seal's resilience overcomes the remaining load). Each metal C-seal ring 30, 40 is preferably designed to maintain elasticity and spring-back over an extended service life.

Figure 11:
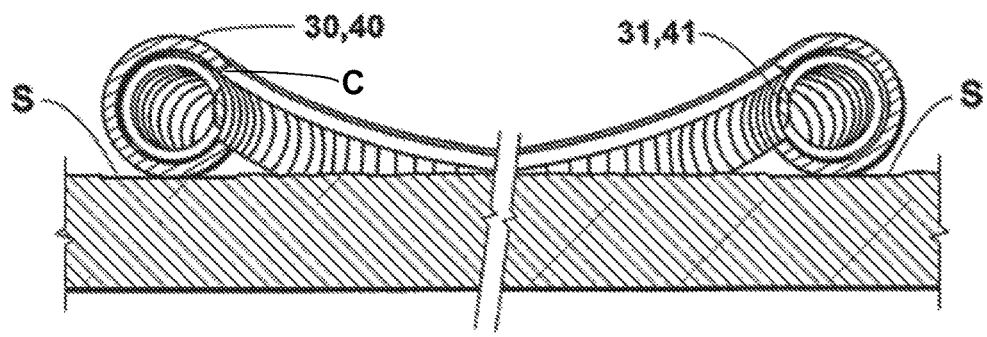
FIG. 11 is a partial cross-section view of the metal C-seal ring of FIG. 10 resting in an initial, non-sealing position on the prepared pipe surface.
Figure 12:
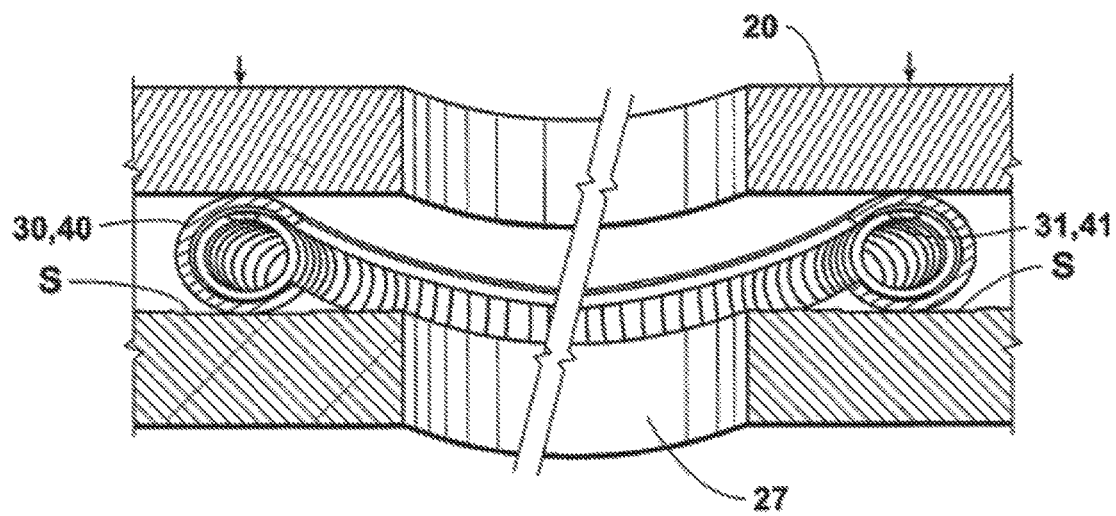
FIG. 12 is a partial cross-section view of the metal C-seal ring of FIG. 10 as to moves between a non-sealing and a final sealing position.

Activation occurs as a securing means 50 drawings the fitting 20 downward to the pipe, thereby placing the rings 30, 40 in compression (see FIGS. 11 to 13). A set of tensioning belts 51 with a chain tension bolt 53, clamp nut 55, clamp washer 57 combination is a suitable securing means 50. Clamp nut 55 can be replaced with a standard hex nut. The fitting 20 may be equipped with alignment means known in the art such as a guide bar or tee (not shown) to align with pipe guides secured to the pipe.

Figure 1:
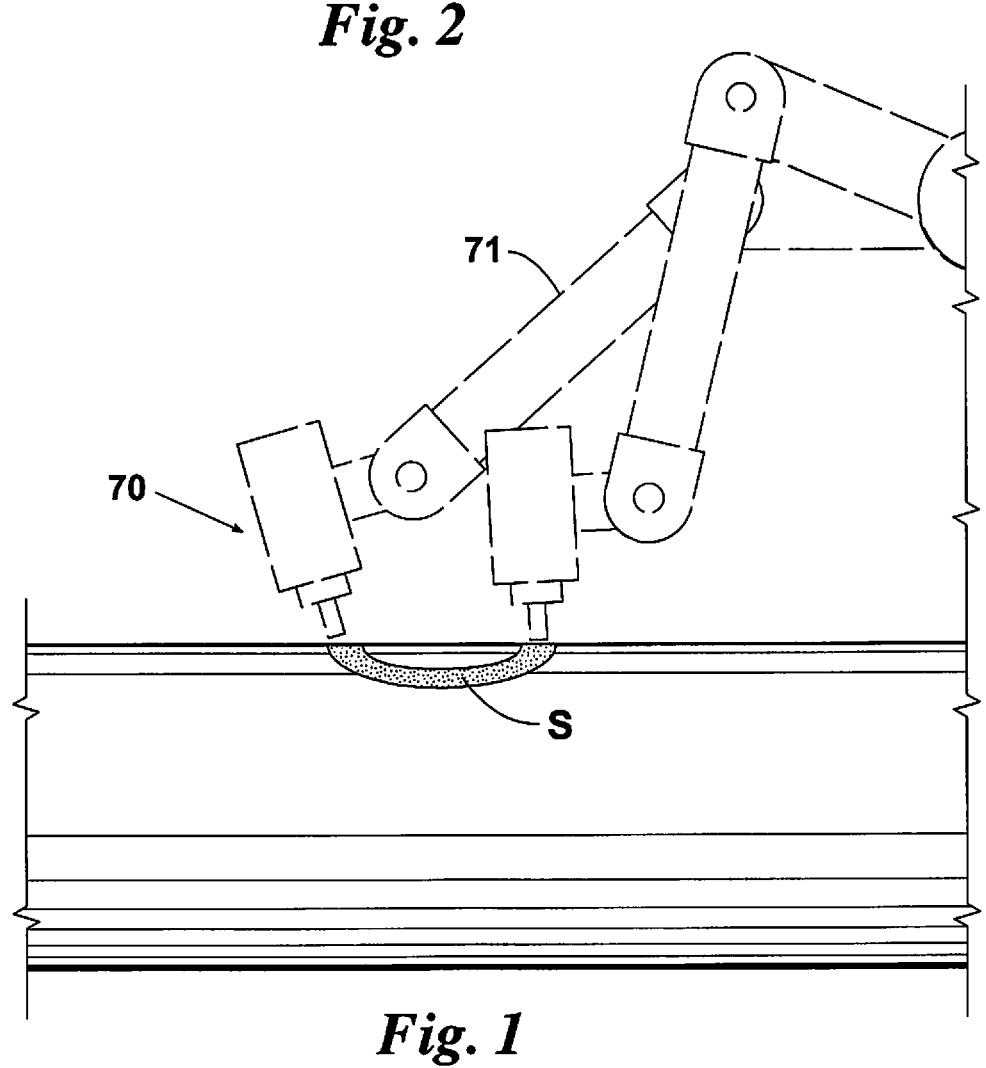
FIG. 1 is view of a preferred embodiment of a system for preparing a pipe surface to receive a metal seal fitting of this invention.

Because the pipe is typically coated or has surface imperfections or defects, the surface "S" of the pipe which lies opposite the pipe-facing side 25 of the fitting 20 is prepared to receive the metal C-seal rings 30, 40 (see FIGS. 1, 2, and 11). Surface preparation means 70—such as but not limited to an industrial robot 71 equipped with milling means or its equivalent and fitted to a machine frame (not shown) located on site and about the pipe—is used to prepare the surface S. Other means 70 for preparing the surface S include a high speed milling head (spindle). Surface S should form an offset for a face to the fitting 20. The shape can be circular (see FIG. 1) or another shape as required.

Proper preparation of the surface is important. Industrial robot 71 should be an accurate machining robot—equipped with appropriate CNC controls, software, and high speed milling techniques—and constrained to the pipe and supported by the ground using a proper support or machine frame.

Referring to FIGS. 11 and 12, as the tensioning belts 51 draw the clamp to the pipe, the metal C-seal rings 30, 40 are compressed and activated to form a metal-to-metal seal with the prepared pipe surface S. When activated, the spring-energized metal C-seal ring 30, 40 can sustain high pressure from both sides and does not compress past the point of spring-back (e.g., 15-20% of the free height, with the ends of the "C" not coming into contact with one another), collapse or flatten. When pressure from inside the fitting 20 is acting inside the "C" of the seal ring 30, the seal ring 30 increases its sealing pressure, thereby allowing for very high seal pressure. Because the contact area between the seal ring 30, 40 and pipe is very small (typically 1-3 mm thick), this high seal pressure does not result in critical pipe stress.

The internal pressure acts only on seal 30. Seal 40 is a backup seal. The cavity between seals 30, 40 can be pressure-tested verify both seals are good prior to tapping into the pipeline)

Preferably, the C-seal rings 30, 40 are coated with soft, ductile metallic coating like silver indium, and tin or the like to provide a soft layer. The coating fills any remaining imperfections in the prepared pipe surface S when the seal ring 30, 40 is under load. When in their final sealing position, the rings 30, 40 provide double block sealing around the tap or access hole.

A method of double block sealing a pipe access connection using fitting 20 includes the, steps of activating a first and a second metal seal ring 30, 40 between an initial non-sealing state and a final sealing state (see FIG. 12). The method also includes the step of preparing the pipe surface S lying opposite the seal rings 30, 40 to provide a sealing face for the rings 30, 40. The preparing step can be done by an industrial robot 71 mounted to a machine frame located on site and about the pipe.

The metal seal rings 30, 40 seal so that no elastomeric seal is required to seal between the pipe-facing side of the fitting and the pipe to which the fitting is secured. In the final sealing state each metal seal ring 30, 40 is not in permanent deformation and can spring-back to its initial, free state.

While preferred embodiments of the fitting, and a system and method of its use, have been described, changes can be made in the details of construction without departing from the scope of the following claims.

What is claimed:

1. A system for use on a pipe, the system including a fitting having a flanged access connection, the fitting further comprising:
    a first and a second metal seal ring each having a C-profile, a spring located within the C-profile, and being shaped to conform to a pipe-facing side of the fitting, the first metal seal ring being larger in diameter than a tap diameter of the flanged access connection, the second metal seal ring being larger in diameter than the first metal seal ring; each metal seal ring being arranged concentric to the flanged access connection;
    a first and a second support plate, the first support plate being located between the first and second metal seal rings, an outer periphery of the first metal seal ring and an inner periphery of the second metal seal ring being in contact with the first support plate when the first and second metal seal rings are in a final sealing state, the second support plate being located outside of the second metal seal ring, an outer periphery of the second metal seal ring being in contact with the second support plate when the second metal seal ring is in a final sealing state.

2. A system according to claim 1 further comprising means for securing the fitting to the pipe, the securing means placing the first and second metal C-seal rings in a final sealing state between the pipe-facing side of the fitting and the pipe.

3. A system according to claim 1 further including means to prepare a surface of the pipe lying opposite the first and second metal seal rings.

4. A system according to claim 3 wherein the surface preparation means is an industrial robot.

5. A system according to claim 1 wherein the second metal seal when in a final sealing state is not in permanent deformation.

6. A system according to claim 1 wherein no elastomeric seal is used to seal between the pipe-facing side of the fitting and the pipe to which the fitting is secured.

7. A system according to claim 1 wherein the first metal seal when in a final sealing state is not in permanent deformation.

* * * * *